3,065,124
BISDITHIOCARBAMATE HYPOCHLORITE REACTION PRODUCTS FOR AGRICULTURAL USE
Elmer A. Fike, Ortin Heights, W. Va., assignor to Roberts Chemicals, Inc., Nitro, W. Va., a corporation of West Virginia
No Drawing. Filed Sept. 15, 1958, Ser. No. 760,839
11 Claims. (Cl. 167—17)

This invention relates to a new chemical reaction, a new reaction product, and the use of the reaction product as a pesticide and insecticide to control fungi and insects on plants, seeds and soil, including its use as a repellent. This application is a continuation-in-part of application Serial No. 714,444, filed February 10, 1958, and now abandoned.

The diammonium and disodium ethylene bisdithiocarbamates are know commercially as Amobam and Nabam, respectively. On oxidation they produce a mixture of mono- and polyethylenethiuram sulfides and disulfides, often termed ethylenethiuram sulfide.

According to this invention, calcium hypochlorite is mixed with Amobam in water solution and the aqueous suspension of the reaction product is applied to plants or the soil. The reaction with Amobam yields a complex mixture which presumably includes calcium salts of dithiocarbamic acid as well as thiuram sulfides and disulfides, probably including polymeric materials. It is well known that the thiuram sulfides and dithiocarbamates are effective fungicides, pesticides and repellents, and the reaction product which appears to contain all of these groups is very effective.

The term "calcium hypochlorite" is used herein to refer to the material to which that term is applied commercially and its equivalents. The commercial product contains the OCl radical, and is known as containing about 70 percent available chlorine.

Illustrative of the preparation of the reaction product is the following example:

Example I

A 100-gallon tank is half filled with water. One quart of a 42 percent solution of diammonium ethylene bisdithiocarbamate is added to the tank. Then, one pound of a commercial grade of calcium hypochlorite (70 percent available chlorine) is sprinkled into the tank as water is fed to the tank to fill it, and during this period the contents of the tank are advantageously stirred to prevent any accumulation of solid matter on the bottom of the tank. Approximately two minutes is required to dissolve the calcium hypochlorite and form the reaction product. This is a solid and is precipitated as a fine suspension in the aqueous reaction mixture.

Used as a spray, the aqueous reaction product is effective in controlling a wide variety of plant diseases, such as those mentioned below in connection with plants on which they occur:

Tomatoes—Early and Late Blight, Anthracnose, Stemphylium and Septoria Leaf Spots.
Onions—Downy Mildew.
Beans (snap and lima)—Downy Mildew, Rust, Anthracnose.
Potatoes, eggplants, peppers—Early and Late Blight.
Corn—Helminthosporium Leaf Blight, Puccinio Rust.
Celery—Early and Late Blight.
Grapes—Bunch Rot, Downy Mildew.
Sour Cherries—Leaf Spot or Shot Hole.
Apples—Scab, Cedar Rust.
Cantaloupe, cucumbers, watermelons and other cucurbits—Downy Mildew, Alternaria Blight (Macrosporium), Anthracnose, Angular Leaf Spot.
Citrus—Scab and Melanose.

Fruit trees are advantageously sprayed at 2- to 4-week intervals from the pre-bloom stage to harvest. The slurry may also be sprayed on flowering plants such as gladioli, roses, etc. When sprayed on a plant, a film of extremely fine particles is formed on the exposed surface of the plant. This film is extremely water resistant and withstands the weather. When applied to soil, its permanence is a desirable characteristic and any liberated ammonia has fertilizer value.

The reaction product is not only effective as a fungicide, but is also an effective insecticide, having been used in the control of rust mites on citrus plants.

A more concentrated preparation than the foregoing is generally used on seeds, such as a slurry prepared from one pint of Amobam (42 percent concentration) and ¾ pound of calcium hypochlorite in 10 gallons of water, to which a small amount of dispersing agent is preferably added. One gallon of this slurry is recommended for the treatment of 100 pounds of corn, pea, bean or other large seed, and 5 gallons per 100 pounds of smaller seed.

The calcium hypochlorite oxidizes the diammonium ethylene bisdithiocarbamate to a complex mixture which includes thiuram sulfide, thiuram disulfide, and dithiocarbamate radicals including calcium derivatives thereof. The concentration of the reaction mixture and the ratio of the hypochlorite to the Amobam may be varied, although the example recites what appears to be a preferred formula. Sufficient hypochlorite should be used to effect the oxidation.

In Example I substantially one pound of calcium hypochlorite is used per pound of diammonium ethylene bisdithiocarbamate (figured on a 100 percent basis). The amount of calcium hypochlorite used may vary from about ½ pound to 1¼ pounds.

Although generally relatively small concentrations in water of substantially .01 to 2 percent of the reaction mixture of Amobam and calcium hypochlorite will be used, up to 15 percent concentration has been used successfully for spraying plants from an airplane, and higher concentrations may be used. Thus there is nothing critical about the concentration employed.

Example II

The comparative effect of calcium hypochlorite with different salts of ethylene bisdithiocarbamate is given in the following example. With reference to the table, it should be explained that on reacting 1 ml. of Amobam and 0.75 g. of calcium hypochlorite, substantially 0.35 g. of calcium reaction product is obtained.

Cobbler potato plants, 5 weeks old, were variously sprayed with different ethylene bisdithiocarbamate salts, Amobam and calcium hypochlorite, and water, all as given in the table. They were allowed to dry for 2 hours. After drying, the plants were inoculated with isolate WV–13 of *P. infestans* and then placed in a temperature-humidity room for 36 hours. Upon removal from this room, the plants were placed in a 20° C. air-temperature greenhouse until symptoms developed.

Six days after inoculation the total number of lesions present on each of three pots used for each test were counted and the results recorded, as below:

| Pesticide | Concentration per 400 ml. | No. of lesions | | | | |
|---|---|---|---|---|---|---|
| | | Pot 1 | Pot 2 | Pot 3 | Total | Mean |
| Mercuric salt | 0.6 g | 4 | 14 | 3 | 21 | 7 |
| Cupric salt | 0.6 g | 2 | 20 | 17 | 39 | 13 |
| Tin salt | 0.6 g | 4 | 11 | 21 | 36 | 12 |
| Cadmium salt | 0.6 g | 11 | 20 | 40 | 71 | 24 |
| Zinc salt | 0.6 g | 0 | 8 | 10 | 18 | 6 |
| Amobam+Calcium Hypochlorite. | 1 ml.+0.75 g | 0 | 1 | 3 | 4 | 1 |
| Water | | 400 | 600 | 500 | 1,500 | 500 |

The zinc salt of ethylene bisdithiocarbamate has been used commercially for treatment of such potato plants, and is known as Zineb. The above results showed that the reaction product of Amobam and calcium hypochlorite gave substantially complete protection against late blight.

Calcium hypochlorite is cheap and readily available, and the reaction product is particularly resistant to the weather. Spreaders, stickers, insecticides, etc. may be added to the reaction mixture, as desired.

What I claim is:

1. The method of preparing a complex reaction product which comprises mixing and thereby reacting aqueous diammonium ethylene bisdithiocarbamate and calcium hypochlorite in the ratio of 1 part of the former to ½ to 1¼ parts of the latter, in an aqueous reaction medium.

2. The method of claim 1 in which the ratio of the reactants is 1 part of the former to substantially 1 part of the latter.

3. The complex reaction product of claim 1.

4. The complex reaction product of claim 1 obtained with the reactants being present in the ratio of substantially 1 part of the former to substantially 1 part of the latter.

5. The method of treating plant parasites on plants and in soils which comprises applying the complex reaction product of claim 1 thereto.

6. The method of treating plant parasites on plants and in soils which comprises applying thereto the complex reaction product of claim 1 obtained with the reactants present in the ratio of substantially 1 part of the former to substantially 1 part of the latter.

7. The method of controlling blight on potato plants which comprises applying to the plants the complex reaction product of claim 1.

8. The method of treating plant parasites on plants which comprises applying the complex reaction product of claim 1 thereto, and adding at least some of the ultimate ammonium compound produced, to the adjacent soil as fertilizer.

9. The method of treating seed from the class consisting of corn, peas and beans, which method comprises treating the seed with the complex reaction product of claim 1.

10. The complex reaction product of 1 part of diammonium ethylene bisdithiocarbamate and substantially ½ to 1¼ parts of calcium hypochlorite in water.

11. The complex reaction product of 1 part of diammonium ethylene bisdithiocarbamate and substantially 1 part of calcium hypochlorite in water.

References Cited in the file of this patent

UNITED STATES PATENTS

| | | |
|---|---|---|
| Re. 22,750 | Tisdale | Apr. 30, 1946 |
| Re. 23,742 | Hester | Nov. 24, 1953 |
| 2,677,698 | Deutschman | May 4, 1954 |
| 2,733,262 | Britton | Jan. 31, 1956 |
| 2,792,394 | Himel | May 14, 1957 |
| 2,844,623 | Fike | July 22, 1958 |

OTHER REFERENCES

Frear: A Catalogue of Insecticides and Fungicides (1948), vol. II, p. 51.

Agr. Chem., vol. 12, No. 9, September 1957, p. 136.